United States Patent [19]

Dondorf

[11] Patent Number: 4,876,531

[45] Date of Patent: Oct. 24, 1989

[54] POSITION DETECTOR FOR THE MOVABLE ELEMENT OF A FLUID-OPERATED ACTUATOR

[75] Inventor: Wolfgang Dondorf, Marienheide-Dannenberg, Fed. Rep. of Germany

[73] Assignee: Pulsotronic Merten GmbH & Co. KG, Gummersbach, Fed. Rep. of Germany

[21] Appl. No.: 208,257

[22] Filed: Jun. 17, 1988

[30] Foreign Application Priority Data

Jun. 27, 1987 [DE] Fed. Rep. of Germany ..... 87109271

[51] Int. Cl.[4] ........................ G08B 21/00; G01L 9/00; H01H 35/38

[52] U.S. Cl. ........................................ 340/686; 73/745; 200/82 R

[58] Field of Search ............. 340/686, 626; 200/82 R, 200/82 E; 73/745; 335/205; 192/30 W; 324/58.5 C; 92/5 R; 91/1

[56] References Cited

U.S. PATENT DOCUMENTS

| | | | |
|---|---|---|---|
| 4,680,436 | 7/1987 | Brausfeld et al. | 200/82 E |
| 4,689,553 | 8/1987 | Haddox | 324/58.5 C |
| 4,705,151 | 11/1987 | Leigh-Monstevens et al. | 192/30 WX |
| 4,752,657 | 6/1988 | Kane et al. | 200/82 E |
| 4,755,637 | 7/1988 | Turck | 200/82 R |
| 4,799,048 | 1/1989 | Goshima et al. | 340/626 |

*Primary Examiner*—Glen R. Swann, III
*Assistant Examiner*—Thomas J. Mullen, Jr.
*Attorney, Agent, or Firm*—Spensley Horn Jubas & Lubitz

[57] ABSTRACT

A device for detecting the position of a movable element of an adjusting member operated by fluid pressure. A cylindrical probe is introduced into the wall of the actuator and extends to near the inner surface of wall. The probe is mounted to be axially displaceable at the holder so that it may be adapted to different wall thicknesses. The holder contains a sealing means for sealing the passage of the cylindrical probe, which is extended by the shaft and is adapted to be rotatable in a thread bore at the rear end of the holder. A circuit box accommodating the electric circuitry is secured to the end of shaft. The position detector, which detects when the piston has approached the probe, may be simply adapted to different cylinder wall thicknesses. This eliminates the requirement of using different types of position detectors whose probes vary by the length of their projection.

9 Claims, 3 Drawing Sheets

POSITION DETECTOR FOR THE MOVABLE ELEMENT OF A FLUID-OPERATED ACTUATOR

BACKGROUND OF THE INVENTION

1. Field of the Invention

The invention relates to a position detector for the movable element of a fluid-operated actuator.

2. Description of Related Art

It is frequently necessary, in the case of pneumatic or hydraulic piston-cylinder units, to detect the front or rear end of the piston or an intermediate position reached by the piston. To this effect, mechanical limit switches may be used. However, the accuracy of such limit switches is insufficient, and their life time in terms of switching operations is relatively low. Further, the service life of such mechanical switches is reduced due to the mechanical wear of parts contained in such switches.

Known limit switches for hydraulic or pneumatic cylinders have been of the proximity type. These known limit switches comprise an electric member which is responsive to the approximation of an electrically conductive element. The electrically conductive element may, for instance, consist of the coil of an oscillator circuit. Upon approximation of a metal element, the oscillator circuit is attenuated, resulting in a change or cessation of the circuit oscillation.

The oscillator circuit coil is provided in a cylindrical probe which is embedded in a bore of a wall of the hydraulic or pneumatic cylinder. The bore communicates with the cylinder chamber. If the piston approaches the end of the probe which includes the electric element, the latter contactlessly reacts on the approximation of the piston, thus indicating that the piston has reached the position to be detected.

However, in the case of known contactless piston position detectors, the reaction distance of the probe is limited to only about 2 mm. Therefore, it is rather important for the end of the probe to be arranged very close to the cylinder chamber. Varying the wall thickness of the cylinder wall entails varying the probe length. On the other hand, the bore of the cylinder wall must be sealed against the high hydraulic or pneumatic pressures.

Manufacturers of contactless piston position detectors therefore generally sell a plurality of models which only differ by the length of the cylindrical probe, which is fixed to the holder and which is sealingly secured at the outside of the pressure cylinder and projects from the holder to such an extent that its end is flush with the inner surface of the cylinder wall. The need to provide a great number of position detectors which only differ by their respective probe lengths is extraordinarily expensive from an engineering and storage point of view.

Moreover, it is quite difficult to always determine by experimentation the exact probe length required for each individual purpose. In fact, sometimes the probe of a position detector may be too long, while the model of the following line is too short for the respective requirement. In such cases, a washer is required to be placed between the cylinder wall and the holder of the position detector, to thereby permit use of the position detector having the longer probe.

It is an object of the present invention to provide a position detector which is applicable within a large range of wall thicknesses of the pressure-operated actuator.

SUMMARY OF THE INVENTION

In accordance with the present invention, these and other objectives are achieved by providing a position detector having a probe which is adjustable relative to the holder, in the axial direction of the probe. By this means, it is possible to change the extent to which the cylindrical probe projects from the holder. Part of the probe extends into the holder comprising in its channel the second sealing means to prevent fluid pressure from escaping from the actuator through the gap between the holder channel and the probe wall. Due to the cylindrical shape of the probe, a sealing inside the holder is ensured in all of the varying axial positions of the probe, and the extent by which the probe projects into the interior of the holder may be changed. Such a position detector may be used with cylinders of different wall thicknesses, it being always ensured that the distance of the probe end from the inner surface of the cylinder wall is very slight.

The position detector of the present invention is not only useful for pressure-actuated cylinders but is also useful for rotating hydromotors, turbines etc. Generally speaking, it is useful for all adjustment members in which a mobile member in a stationary part is moved under fluid pressure. However, the main applicability is believed at present to be in the pressure cylinder field.

It is an additional favorable feature of the position detector that the respective axial position of the probe may be easily determined by moving the displaceable element of the pressure-actuated actuator into a position near the bore of the wall. At that moment, the probe may be advanced in the bore until it abuts against the moving element, after which it may be slightly withdrawn. Thus, the optimum position of the probe relative to the wall of the actuator and relative to the movable element may be located, the probe being responsive to the approach of the movable element without projecting into the travel path.

Preferably, the shaft is continuously adjustable at the holder, although an adjustment in small steps is also possible, for instance with the use of a lock-in means.

In a preferred embodiment of the invention the sealing against the escaping pressure between the holder and wall, on the one hand, and between the holder and the probe, on the other hand, is exclusively achieved in the body of the holder, while the shaft extends through the holder to be supported axially at the end averted from the wall.

The circuit box accommodating electric components of the position detector—except for the electric component contained in the probe—is suitably mounted at the rear shaft end and may be moved together with the probe and the shaft in an axial direction relative to the holder. The circuit box may be used like a handle for the axial adjustment of the probe. On the other hand, when the probe has been set to the proper position, the circuit box is preferably tiltable about the shaft axis so that it may be moved to the most favorable position for the connection of an external line.

In another preferred embodiment of the invention limiters are provided which only allow a certain rotation of the circuit box without a concomitant turning of the shaft and the probe. However, in the case of further rotation of the circuit box, the shaft is rotated as well, thus allowing an axial adjustment of the probe in that the circuit box is rotated about the shaft axis.

BRIEF DESCRIPTION OF THE DRAWINGS

A detailed description of a preferred embodiment of the invention will be made with reference to the accompanying drawings, wherein like numerals designate corresponding parts in the several figures.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention. The scope of the invention is best defined by the appended claims.

Figure 1:
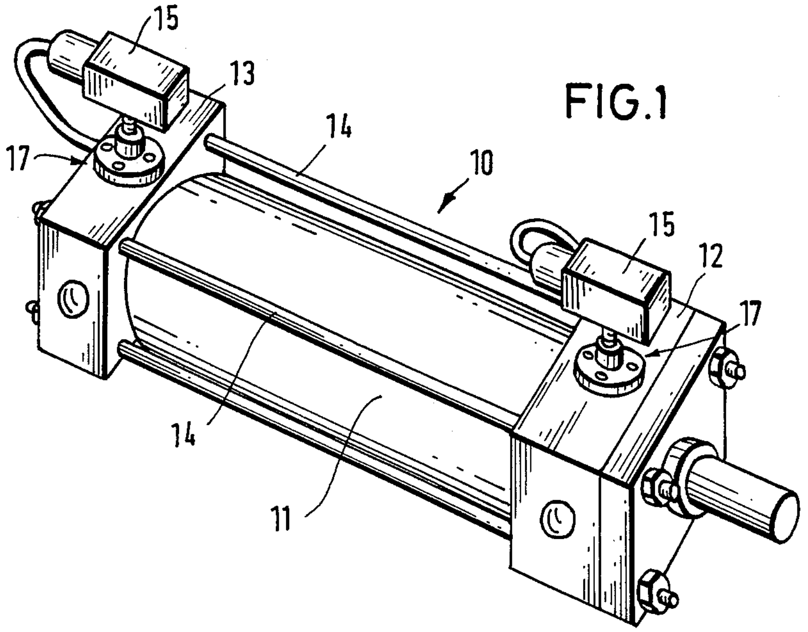
FIG. 1 is a perspective view of an actuator in the form of a piston-cylinder unit provided with two position detectors.

FIG. 1 shows a hydraulic cylinder 10 in which a (non-illustrated) piston is movable. The hydraulic cylinder 10 comprises a tubular central portion 11 and two end pieces 12 and 13. The cylinder bore extends through the central portion 11 into the end pieces 12 and 13 having the tension rods 14 therebetween. Due to a position detector 15 fixed to each of the end pieces 12 and 13, the front and rear end positions of the piston in the cylinder may be detected.

Figure 2:
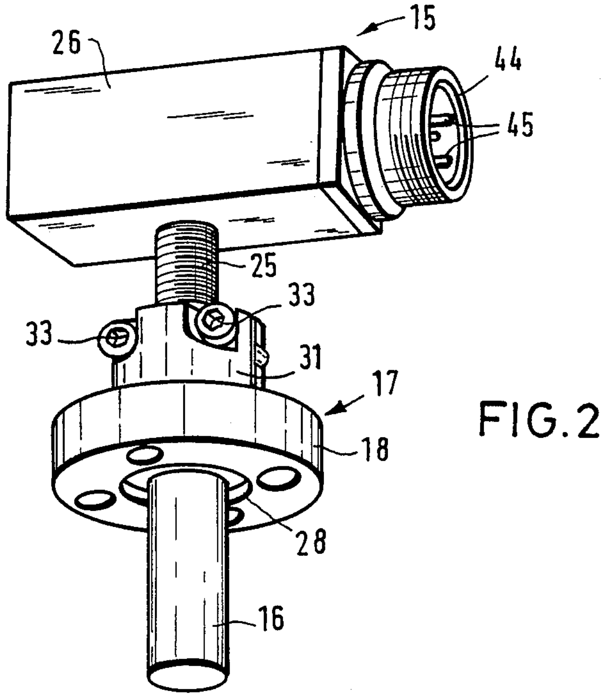
FIG. 2 is a perspective view of a position detector.
Figure 3:
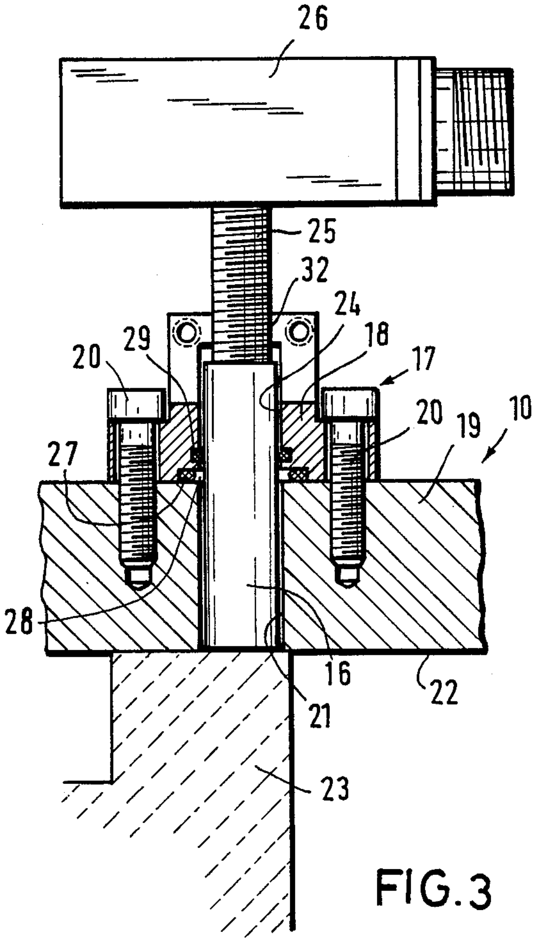
FIG. 3 is a longitudinal section of the wall of the pressure cylinder to which the position detector is fixed.
Figure 4:
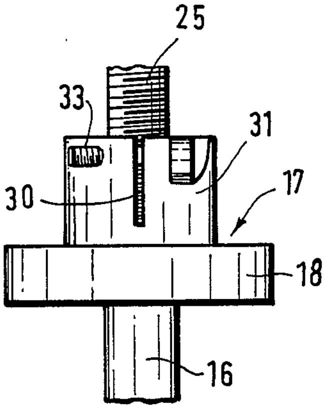
FIG. 4 is a side view of the clamping means for fixing the position of the shaft relative to the holder and FIG. 5 is a longitudinal section of the probe, the shaft and the circuit box.

As evident from FIG. 2, the position detector 15 contains a cylindrical probe 16 which projects from a block-shaped solid holder 17 with a flange 18 which is secured externally by screws 20 to the wall 19 of the cylinder 10 (FIG. 3). The probe 16 projecting from the center of the flange 18 extends into a bore 21 of the wall 19. While it is preferable to situate the end of the probe 16 as close as possible to the inner surface 22 of the wall 18 along which the piston 23 sweeps, the end of the probe 16 preferably should not project beyond the inner surface 22 so as not to interfere with the travel of the piston 23.

The cylindrical probe 16 which extends through the cylindrical channel 24 of the flange 18 is extended outside of the channel 24 by a hollow shaft 25 which is provided with an external thread. The upper end of the shaft 25 carries the circuit box 26.

For establishing a sealing contact between the flange 18 and the wall 19, a first annular type sealing means 27 is accommodated in an annular groove 28 which is provided in the surface of the flange 18 butting against the wall 19. If, upon tightening the screws 20, the flange 18 is pressed against the wall 19, the first sealing means 27 is compressed axially.

A second, annular type sealing means 29 tightly encompassing the probe 16 is provided within the area of the channel 24 in an annular groove of the flange 18. The second sealing means 29 is responsible for sealing the annular gap between the probe 16 and the channel 24. Both sealing means 27 and 29 may be combined to form a common sealing assembly. What is important is that the gap between the holder 17 and the wall 19, on the one hand, and the annular gap between the channel 17 and the probe 16, on the other hand, are sealed, so that no pressure fluid from the cylinder 10 may escape to the outside.

At the end of the holder 17 which is averted from the wall 19, there is provided a tubular piece 31 having longitudinal slots 30 and forming an integral part of the holder 17. Channel 24 extends at a constant diameter into the lower region of the tubular piece 31. The upper end includes a threaded bore 32 having a diameter inferior to that of the channel 24 and having a thread which meshes with the external thread of the shaft 25. The thread before 32 forms an engaging means cooperating with the shaft 25 for adjustment of the shaft position.

The slots 30 of the tubular piece 31 are open ended towards the upper end of tubular piece 31. In other words, the slots 30 also divide the thread bore 32. Each of the slots 30 is traversed by a screw 33 which may be tightened in order to urge the edges of the slot 30 against one another and to reduce the diameter of the thread bore 32. The screws 33 together with the slots 30 form a clamping means used to brace the shaft in the adjusted position.

Figure 5:
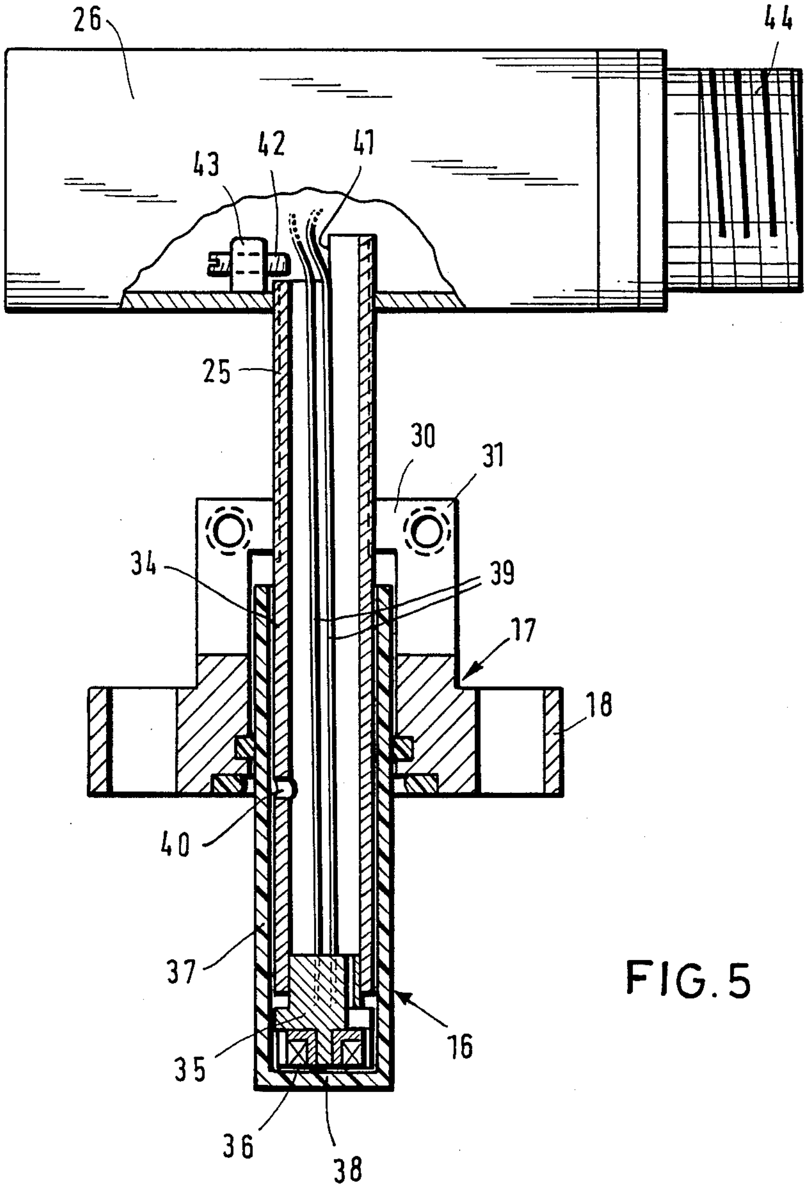

FIG. 5 shows the internal design of the probe 16 and the fixation of the circuit box 26. As is evident, the hollow metal shaft 25 provided with an external thread is integrated with the tube 34, which is coaxial to the shaft. At the end of the tube 34, there is secured a ceramic or plastic carrier body 35. The end of the carrier body 35 carries an electric member 36. The electric member 36 is responsive to the approach of a metal element, the metal element preferably being an annular coil which is housed in a ferromagnetic core open unilaterally. The external diameters of the carrier body 35 and of the electric component 36 are equal to the external diameter of the tube 34. The tube 34, the carrier body 35 and the electric component 36 are tightly enclosed by the cylindrical probe jacket 37. The bottom wall 38 of the probe jacket 37 forms the external end of the probe 16. From the electric component 36 closely adjoining the inside of the bottom wall 38, ducts 39 extend through the tube 34 and the shaft 25 into the interior of the circuit box 26.

The probe jacket 37 is preferably made of an oil-resistant plastic material, preferably of polyacetal. The probe jacket 37 is directly supported by the tube 34. The interior of the shaft 25 and of the tube 34 are filled with a non-illustrated plastic sealing compound to also protect the elements against external pressure. Through a hole 40 in the wall of the tube 34, the sealing compound may also get into the area between the tube wall and the probe jacket 37 in order to continuously enclose the electric member 36 and the carrier body 35.

The circuit box 26 fixed at the upper end of the shaft 25 may rotate, within limits, about the shaft axis without entwining the shaft 25. The circuit box 26 is in thread engagement with the shaft 25. The end of the shaft 25 which projects into the box 26 is provided with a recess 41 which extends over about 180° of the shaft circumference. A pin 42 secured displaceably to a block 43 fixed to the circuit box 26 projects into the recess 41. The pin 42 together with the recess 41 form a rotation limiter so that, for its axial displacement, the shaft 25 may be turned together with the rotating housing 26. On the other hand, the rotation limiter allows a free rotation of the circuit box 26 by about 180° without a simultaneous rotation of the shaft 25 and of the probe 16. By this means, the circuit box 26 may be freely set into the desired direction.

The end of the circuit box 26 is provided with a union plug connection 44 comprising a thread ring surrounding contact pins 45 for the connection of external lines. The circuit box 26 contains the remaining components of the proximity switch to which the electric component 36 belongs.

By rotating the shaft 25, the portion of the probe 16 which projects from the holder 17 may be changed in length. The shaft 25 is turnable in the thread bore 32 and, together with the probe 16, is axially displaceable relative to the holder 17. The amount of such a displacement corresponds to about ⅔ of the length of the probe 16. Hence, via the abutment surface of the holder 17 at the wall 19, an adjustment of the projection of the probe 16 is possible. The projecting length of the probe 16 may be adapted within a large range to the prevailing wall thickness. When the correct position in length of the probe 16 is determined, the screws 33 may be tightened so that the probe position relative to the holder 17 is fixed.

Results from tests of a position detector manufactured in accordance with the present invention show that the position detector remains fully operative at a hydraulic pressure of 200 bar (3000 psi) after millions of pressure changes and switch operations.

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A device for detecting the position of a movable part of a fluid-operated actuator having an actuator wall including a bore therein, the device comprising:
- a holder configured to be secured to the wall of the actuator so that the holder encompasses the bore of the wall, the holder having a cylindrical channel,
- a cylindrical probe projecting from the holder and configured for introduction into the bore, the probe having a detector for detecting the movable part,
- guide means for displaceably guiding the probe in the cylindrical channel of the holder,
- first sealing means for establishing a seal between the holder and the wall,
- second sealing means for establishing a seal between the holder and the probe,
- a hollow shaft extending from the probe, and
- adjustment means for axially adjusting the relative position of the hollow shaft and the holder,
- whereby the length of projection of the probe from the holder is adjustable.

2. A device as set forth in claim 1, further comprising continuous adjustment means for continuously adjusting the relative position of the shaft and the holder.

3. A device as set forth in claim 1, wherein the holder further comprises engaging means adjacent the channel and cooperating with the shaft for adjusting the relative position of the shaft and the holder.

4. A device as set forth in claim 3, wherein the shaft includes a thread and the engaging means comprises a thread meshing with the thread of the shaft.

5. A device as set forth in claim 4, wherein the engaging means further comprises a clamp for fixing the relative position of the shaft and the holder.

6. A device as set forth in claim 1, further comprising:
- a circuit box positioned at an end of the shaft,
- an electric element associated with the detector, and
- at least one duct connected to the electric element and extending into the circuit box.

7. A device as set forth in claim 6, further comprising means for rotating the circuit box relative to the shaft and a rotation limiter for rotating the circuit box together with the shaft to thereby adjust the axial position of the shaft.

8. A device as set forth in claim 1, wherein the probe further comprises a cylindrical jacket filled with a sealing compound as a support against external pressure.

9. A device as set forth in claim 1, wherein the probe further comprises a tube integrated with the shaft and includes a tubular probe jacket having a bottom wall, the tube forming a support against external pressure, and wherein the detector is mounted at the end of the tube and is covered by the bottom wall of the probe jacket.

* * * * *